H. DEAN.
NON-SPILLABLE BATTERY JAR OR CONTAINER.
APPLICATION FILED OCT. 24, 1918.

1,376,923.

Patented May 3, 1921.
3 SHEETS—SHEET 1.

WITNESS:
Robt R Kitchel

INVENTOR
Herbert Dean
BY
Cunyurter B Swinghton
ATTORNEY.

H. DEAN.
NON-SPILLABLE BATTERY JAR OR CONTAINER.
APPLICATION FILED OCT. 24, 1918.

1,376,923. Patented May 3, 1921.
3 SHEETS—SHEET 2.

INVENTOR
Herbert Dean
BY
Augustus B. Stoughton
ATTORNEY.

WITNESS:

H. DEAN.
NON-SPILLABLE BATTERY JAR OR CONTAINER.
APPLICATION FILED OCT. 24, 1918.

1,376,923.

Patented May 3, 1921.
3 SHEETS—SHEET 3.

WITNESS:

INVENTOR
Herbert Dean
BY
ATTORNEY.

UNITED STATES PATENT OFFICE.

HERBERT DEAN, OF CLIFTON JUNCTION, NEAR MANCHESTER, ENGLAND.

NON-SPILLABLE BATTERY JAR OR CONTAINER.

1,376,923. Specification of Letters Patent. Patented May 3, 1921.

Application filed October 24, 1918. Serial No. 259,528.

*To all whom it may concern:*

Be it known that I, HERBERT DEAN, a subject of the King of England, residing at Clifton Junction, near Manchester, county of Lancaster, England, have invented a certain new and useful Non-Spillable Battery Jar or Container, of which the following is a specification.

The invention relates to non-spillable jars or containers for secondary or storage batteries and its principal object is to provide an improved construction of jar or container which will properly ventilate the battery and efficiently prevent spilling or egress of the electrolyte in all positions of the battery.

The invention will be claimed at the end hereof, but will be first described in connection with the embodiments of it chosen for illustration in the accompanying drawings, in which—

Figure 2:
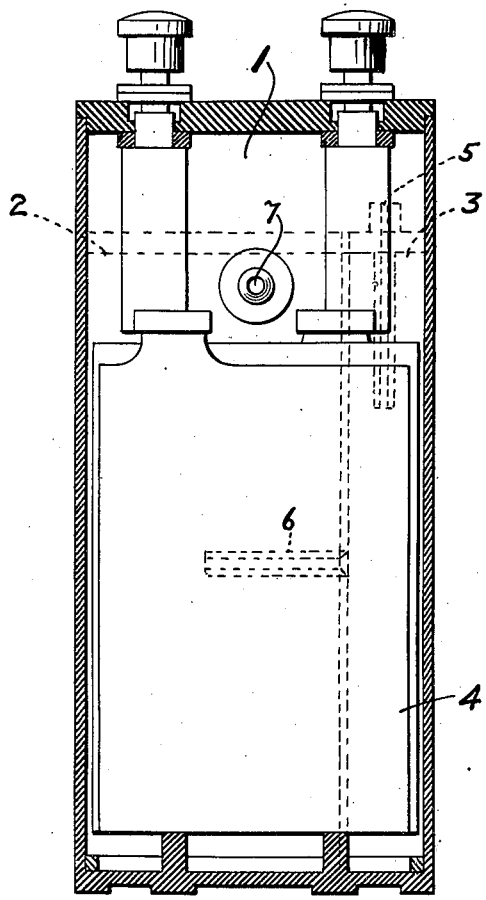
Figure 1:
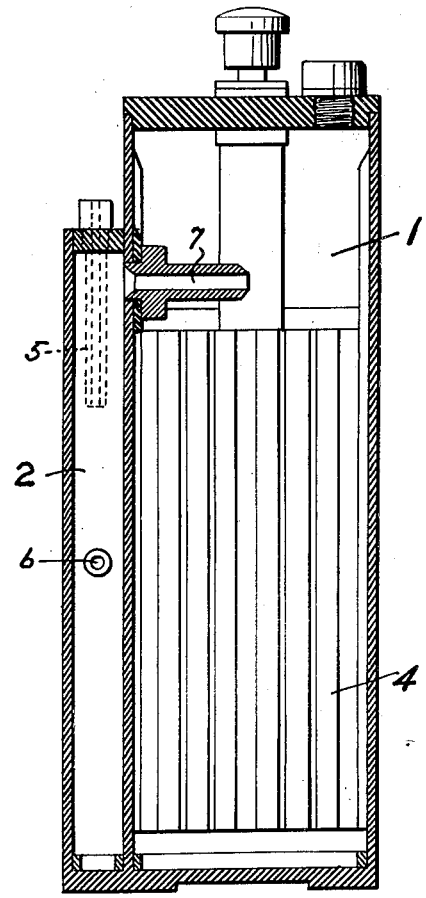
Figure 3:
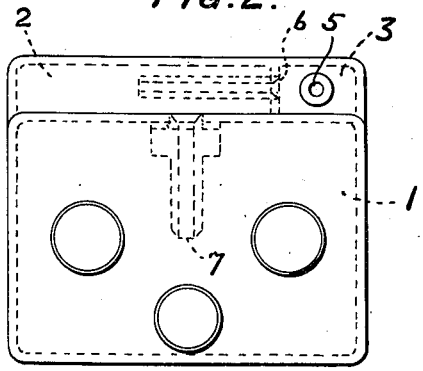

Figures 1, 2 and 3 are respectively cross-sections at right angles to each other and a plan view of a battery jar or container embodying features of the invention.

Figure 4:
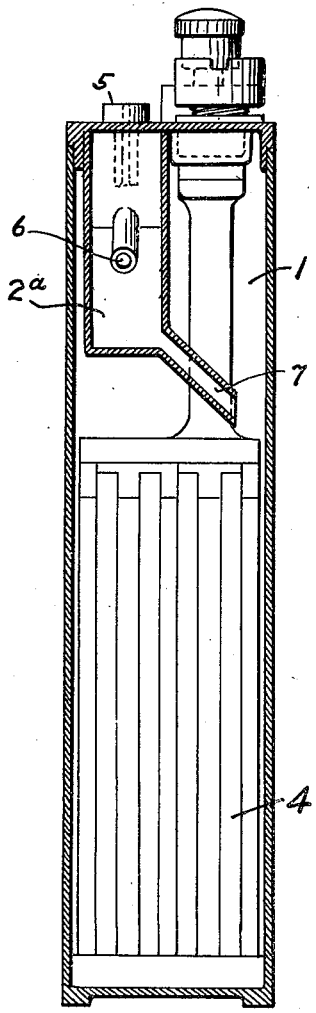
Figure 5:
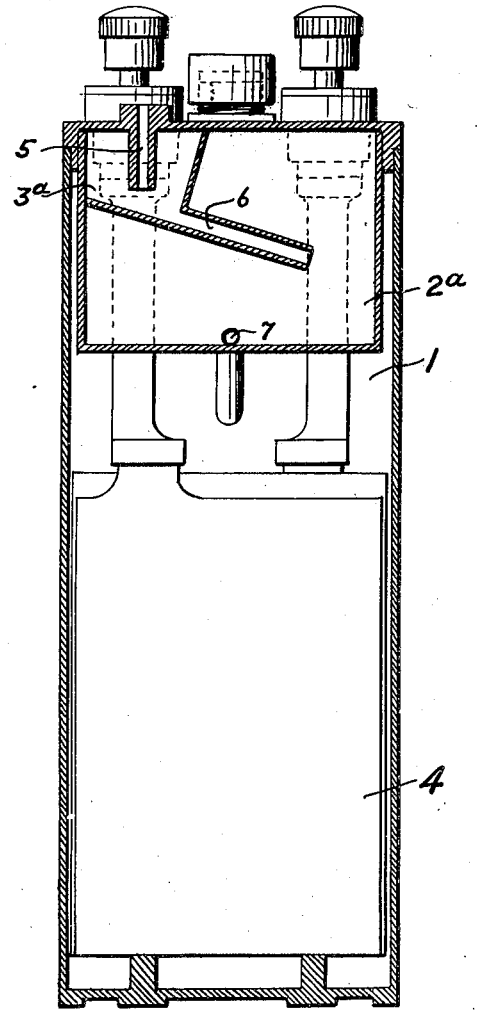
Figure 6:
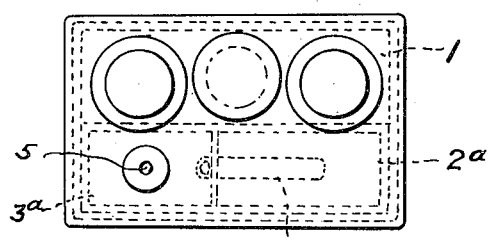

Figs. 4, 5, and 6, are similar views of a battery jar or container embodying a modification of the invention.

Figure 8:
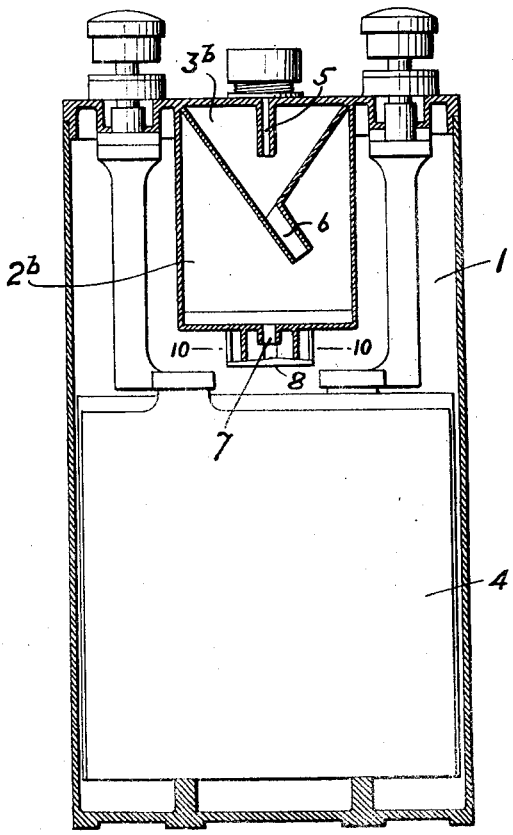
Figure 7:
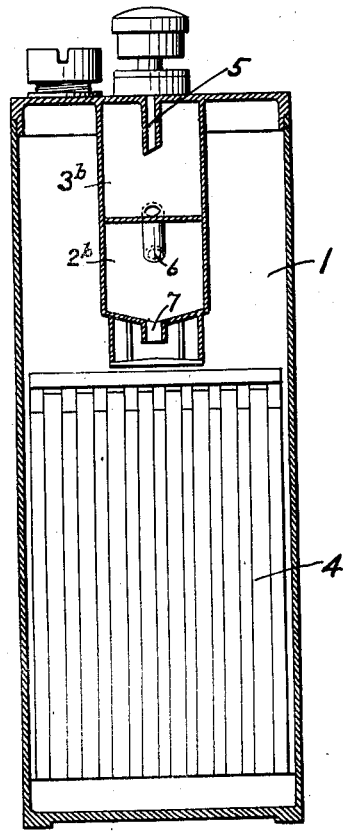
Figure 9:
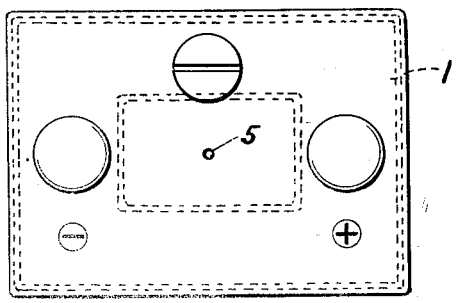
Figure 10:

Figs. 7, 8, and 9 are similar views of a battery jar or container embodying another modification of the invention, and Fig. 10, is a sectional view on the line 10—10 of Fig. 7.

In the drawings, Figs. 1 to 3, 1, 2, and 3 indicate compartments of which two, 2 and 3, are arranged alongside of the other compartment 1, and are shown as of less height. As shown in Figs. 4 to 6, the compartment $2^a$ is arranged within the compartment 1 and the compartment $3^a$ is arranged within the compartment $2^a$. The arrangement shown in Figs. 7 to 9, is the same in that the compartment $2^b$ is arranged within the compartment 1 and the compartment $3^b$ is arranged within the compartment $2^b$, but the shape of the compartments $2^b$ and $3^b$ is slightly different from the shape of the compartments $2^a$ and $3^a$. In each case the compartments intercommunicate and the compartment 1 is adapted to contain the plate structure 4 with space beyond or above it intended, among other things, to accommodate the electrolyte when the battery is inverted. 5, is an atmospheric vent that communicates with the compartment 3, $3^a$ or $3^b$. 6, is an opening from the compartment 3, $3^a$, $3^b$ to the compartment 2, $2^a$, $2^b$. 7, is an opening from the compartment 2, $2^a$, $2^b$, to the compartment 1. The opening 7 is arranged generally centrally of the compartment 1, in such position that when the jar or container is inverted or is laid upon its side the opening will be above the level of the electrolyte. As shown the vent opening 5 and the openings 6 and 7 are provided with tubes so disposed that drainage back into the compartment 1 of any liquid that may be carried into the other compartments is not opposed and such drainage is promoted in the structure shown in Figs. 4 to 9, by the arrangement of the tubes at the bottom of the compartments and by their appropriate disposition for helping drainage when the battery is in upright position. The trough-like construction of the bottom of the compartment $2^b$ (Fig. 7) and the similar construction of the compartment $3^b$ promotes such drainage. 8 is a baffle applied to the opening 7 (Fig. 8) and its purpose is to oppose the entrance of electrolyte into the compartment $2^b$ and to permit of the escape of gas. Of course the battery jar or container may be made of any appropriate material, but celluloid is a good material from which to make it.

It will be obvious to those skilled in the art that modifications may be made in the shape and details of the compartments without departing from the spirit of the invention which is not limited as to details of construction or otherwise than as the appended claims and the prior state of the art may require.

What I claim is:

1. A non-spillable battery jar or container comprising three intercommunicating compartments of which one (3, $3^a$, $3^b$) is provided with an atmospheric vent, another (1) is adapted to contain the plate structure and provide space for electrolyte in all positions of the container, and of which the third (2, $2^a$, $2^b$) is interposed between the other two and communicates with the second by an opening above the electrolyte level in all positions of the container, substantially as described.

2. A non-spillable battery jar or container comprising compartments of which the outer one (1) is adapted to contain the plate-structure and provide space for electrolyte in all positions of the container, the intermediate one ($2^a$, $2^b$) is arranged in said space and communicates with the outer compartment above the level of the electrolyte in all positions of the container, and the inner compartment (3ª, 3ᵇ) is arranged in the intermediate compartment and communicates therewith and is provided with an atmospheric vent, substantially as described.

3. A non-spillable battery jar or container comprising a compartment (1) adapted to contain the plate structure and provide space for electrolyte in normal and all positions of the container, an intermediate compartment (2ª, 2ᵇ) arranged in said space and communicating for drainage in its bottom with the plate compartment above the level of the electrolyte in all positions of the container, and a third compartment (3ª, 3ᵇ) arranged within and communicating for drainage at its bottom with the intermediate compartment and provided with an atmospheric vent, substantially as described.

4. A non-spillable battery jar or container comprising compartments of which the outer one is adapted to contain the plate structure and provide space for electrolyte in all positions of the container, the intermediate one is arranged in said space and provided with an open tube extending into the outer compartment above the level of the electrolyte in all positions of the container, and the inner compartment is arranged in the intermediate compartment and provided with an open tube extending into the intermediate compartment and with an atmospheric vent, substantially as described.

5. A non-spillable battery jar or container comprising three intercommunicating compartments of which one is provided with an atmospheric vent having an inwardly extending tube, of which the second is adapted to contain the plate structure and provide space for electrolyte in all positions of the container, and of which the third is provided with a tube communicating with the second above the level of the electrolyte in all positions of the container and is also provided with a tube communicating with the first compartment and extending in a direction opposed to possible flow of electrolyte toward the vent, substantially as described.

HERBERT DEAN.